United States Patent [19]
Nishino et al.

[11] Patent Number: 5,586,385
[45] Date of Patent: Dec. 24, 1996

[54] METHOD OF MANUFACTURING A THIN FILM MAGNETIC HEAD

[75] Inventors: Hiromi Nishino, Kitakatsuragi-gun; Akiyoshi Fujii, Ikoma-gun, both of Japan

[73] Assignee: Sharp Kabushiki Kaisha, Osaka, Japan

[21] Appl. No.: 599,858

[22] Filed: Feb. 13, 1996

Related U.S. Application Data

[63] Continuation of Ser. No. 213,917, Mar. 15, 1994, abandoned.

[30] Foreign Application Priority Data

Mar. 16, 1993 [JP] Japan .................................. 5-055970
Dec. 27, 1993 [JP] Japan .................................. 5-332864

[51] Int. Cl.⁶ ........................... G11B 5/127; B29C 45/14
[52] U.S. Cl. .................... 29/603.16; 29/603.07; 156/245; 264/272.16; 360/126
[58] Field of Search ............... 29/603.07, 603.13, 29/603.16; 264/255, 272.11, 272.16; 156/242, 245; 360/122, 126

[56] References Cited

U.S. PATENT DOCUMENTS

| | | | |
|---|---|---|---|
| 3,712,575 | 1/1973 | Bement et al. | 29/603 X |
| 4,251,297 | 2/1981 | Kawabata et al. | 29/603 X |
| 4,320,427 | 3/1982 | Bogen | 29/603 X |
| 4,733,455 | 3/1988 | Nakamura et al. | 29/603 |
| 4,876,790 | 10/1989 | Grimm et al. | 29/603 |
| 4,927,580 | 5/1990 | Nasu et al. | 264/272.16 X |
| 5,063,653 | 11/1991 | Sandaiji et al. | 29/603 |
| 5,078,944 | 1/1992 | Yoshino | 264/272.16 X |
| 5,136,775 | 8/1992 | Onoe et al. | 29/603 |

FOREIGN PATENT DOCUMENTS

| | | |
|---|---|---|
| 0528459 | 2/1993 | European Pat. Off. . |
| 2535500 | 5/1984 | France . |
| 60-182037 | 9/1985 | Japan . |
| 2130425 | 10/1983 | United Kingdom . |
| 2130425 | 5/1984 | United Kingdom . |

OTHER PUBLICATIONS

Patent Abstracts of Japan, vol. 9, No. 292, P–406, Nov. 19, 1985.
Patent Abstracts of Japan, vol. 10, No. 34, P–427, Feb. 8, 1986.
Patent Abstracts of Japan, vol. 10, No. 45, P–430, Feb. 21, 1986.
Patent Abstracts of Japan, vol. 11, No. 287, P–617, Sep. 17, 1987.
Patent Abstracts of Japan, vol. 12, No. 210, P–717, Jun. 16, 1988.
Patent Abstracts of Japan, vol. 15, No. 226, P–1213, Jun. 10, 1991.
Patent Abstracts of Japan, vol. 15, No. 388, C–0872, Oct. 2, 1991.
Patent Abstracts of Japan, vol. 16, No. 210, E–1203, May 19, 1992.
Patent Abstracts of Japan, vol. 17, No. 366, P–1571, Jul. 9, 1993.
Patent Abstracts of Japan, vol. 9, No. 292, p. 406, Nov. 1985.

*Primary Examiner*—S. Thomas Hughes
*Attorney, Agent, or Firm*—David G. Conlin; William J. Daley, Jr.

[57] ABSTRACT

A method of manufacturing a thin film magnetic head includes the steps of, integrally forming a resin mold of a prescribed thickness by insert molding on a substrate including an element portion and a wiring connection portion, and shaping in the vicinity of the element portion an end of the substrate to form a magnetic recording medium sliding surface. According to this method, the manufacturing process can be simplified, and the lower manufacturing cost and higher yield can be implemented.

10 Claims, 7 Drawing Sheets

METHOD OF MANUFACTURING A THIN FILM MAGNETIC HEAD

This is a Continuation of application Ser. No. 08/213,917 filed Mar. 15, 1994 now abandoned.

BACKGROUND OF THE INVENTION

1. Field of the Invention

The present invention relates to thin film magnetic heads for magnetic recording apparatus, such as audio visual apparatus, and a method of manufacturing the same, and particularly, to a thin film magnetic head with improved productivity, cost performance and tape running characteristics, and a method of manufacturing the same.

2. Description of the Background Art

Hereinafter, description will be made on a conventional method of manufacturing a thin film magnetic head with reference to FIGS. 9A to 9F and FIG. 10.

In a conventional method of manufacturing a thin film magnetic head, as shown in FIG. 9A, a layer to be a lower magnetic core layer 22, which is made of a soft magnetic thin film of Ni—Fe, Fe—Al—Si, Fe—Al—N, Co—Zr or the like having high saturation magnetization characteristics, is formed with a sputter method or the like on a wafer substrate 21 of crystallized glass, Mn—Zn ferrite or the like having excellent wear resistance. After patterning this layer in a prescribed configuration to form lower magnetic core layer 22, a magnetic gap 23 made of a mineral insulating layer of $SiO_2$, $Si_3N_4$, $Al_2O_3$ or the like is formed on lower magnetic core layer 22 with a sputter method. A bias lead 30 and a magnetoresistive element (hereinafter referred to as "an MR element") 31 are formed and subjected to insulating coating. An upper magnetic core layer 24 is then formed in a prescribed configuration similarly to lower magnetic core layer 22, to form a structure shown in FIG. 9A.

As shown in FIG. 9B, a passivation film 25 of $SiO_2$, $Si_3N_4$, $Al_2O_3$ or the like is formed on an element portion on the substrate excluding a wiring connection portion P with a sputter method, a plasma CVD (Chemical Vapor Deposition) method or the like.

Subsequently, a protruding portion of passivation film 25 on element portion S is planarized by flattening polishing (FIG. 9C). A Cr film is formed thereon as a contact layer by vapor deposition or a sputter method, and a protection plate 26 of Zn—ferrite, $CaTiO_3$ or the like is attached with an epoxy family adhesive or the like (FIG. 9D).

Wafer substrate 21 on which a plurality of magnetic heads are formed is then cut, and subjected to cylindrical grinding and tape lapping, to form a magnetic tape sliding surface B with a prescribed gap depth (FIG. 9E). A flexible printed substrate 27 as a terminal wiring is connected to wiring connection portion P on substrate 21 by a known wire bonding method or a tape automatic bonding method (hereinafter referred to as TAB), and covered with a resin mold 28 (FIG. 9F).

The thin film magnetic head in a cut off tip is incorporated into a tape guide 29 with prescribed accuracy (FIG. 10), to form a thin film magnetic head unit shown in FIG. 11, where a magnetic recording medium 20 is sliding in contact with magnetic head sliding surface B.

While FIGS. 9A to 9F and FIG. 10 show the conventional manufacturing process of a magnetoresistance effect type thin film magnetic head having bias lead 30 and MR element 31, similar process can be applied to a magnetic induction type thin film magnetic head, except that a conductor coil is formed in place of bias lead 30 and MR element 31.

In the conventional manufacturing method of the thin film magnetic head described above, however, various and complicated steps are required for finishing a head unit after formation of element portion S on substrate 21, which brings about the following problems.

(i) In order to cover the step at element portion S completely, passivation film 25 of mineral material shown in FIG. 9B must be formed in the thickness of 10 to 20 μm, which requires long time of 6 to 12 hours, even employing a plasma CVD method.

(ii) The difference of the polished amount in flattening polishing of passivation film 29 shown in FIG. 9C might be caused by an error in thickness, deformation of the substrate or the like, so that upper magnetic core layer 22 on element portion S would be partially exposed out of passivation film 25.

(iii) The magnetic tape sliding surface might be damaged by a crack at passivation film 25 caused by polishing of the magnetic tape sliding surface shown in FIG. 9E.

(iv) Protection plate 26 attached as shown in FIG. 9D might be displaced by thermal stress in connecting or molding the terminal wiring shown in FIG. 9F.

(v) Because of these disadvantageous events in (i) to (iv), the yield is decreased, and the production cost is increased.

In addition, wear of the tape sliding surface causes reduction of frequency characteristics and an error between tracks in a reproduced output. Enhancement of wear resistance of the magnetic head sliding surface is thus desired.

SUMMARY OF THE INVENTION

One object of the present invention is to provide a manufacturing process of a thin film magnetic head without requiring formation and flattening polishing of a passivation film which have been indispensable in the conventional method of manufacturing the thin film magnetic head described above, simplifying the process to implement reduced time therefor, and thus, reducing the manufacturing cost and enhancing the yield.

Another object of the present invention is to provide a thing film magnetic head with improved wear resistance on a magnetic tape sliding surface, and a method of manufacturing the same.

The manufacturing method of a thin film magnetic head of the present invention is related to a method of manufacturing a thin film magnetic head including on a substrate an element portion for reading a magnetic signal and a wiring connection portion connected to a terminal wiring for taking out an electric signal from the element portion is provided. The manufacturing method is characterized by including the steps of forming the element portion on the substrate; connecting the terminal wiring to the wiring connection portion; integrally forming a resin mold of a prescribed thickness by insert molding on the substrate including the element portion and the wiring connection portion; and shaping in the vicinity of the element portion an end of the substrate on which the resin mold is integrally formed, to form a magnetic recording medium sliding surface.

According to the method of the present invention, the conventional complicated two-step process of forming a mineral material film, that is, formation and flattening polishing of a passivation film on the element portion can be replaced by a single step of integral formation of a resin mold. Accordingly, the process will be considerably reduced and simplified compared to the conventional process wherein a passivation film of mineral material is formed, so that time and cost for the manufacture can be reduced. In addition, since a passivation film of mineral material is not employed, problems, such as a crack caused by polishing the magnetic tape sliding surface and deformation of the protection plate in connecting of the terminal wiring, are avoided, whereby the yield of the product can be enhanced.

In one preferred embodiment of the method of manufacturing the thin film magnetic head in accordance with the present invention, the step of integrally forming the resin mold is performed with a metal plate being disposed on the resin mold in a region from an end of the substrate to be a magnetic recording medium sliding surface at least over the element portion in the insert molding.

According to the method of the present invention, in the vicinity of the element portion including the magnetic recording medium sliding surface, wear of the resin mold formed on the substrate can be reduced due to the existence of the metal plate, whereby wear resistance of the magnetic recording medium sliding surface is enhanced, and thus, life and reliability of the thin film magnetic head is further enhanced.

In another preferred embodiment, the method of the manufacturing the thin film magnetic head in accordance with the present invention further includes, prior to the step of the integrally forming the resin mold, the step of forming a silicon oxide film of a prescribed thickness on the upper surface of an upper magnetic core layer included in the element portion.

According to this method, water is prevented from externally entering the element portion, so that moisture resistance of the thin film magnetic head can be enhanced.

In still another embodiment, the method of manufacturing the thin film magnetic head in accordance with the present invention further includes, after the step of shaping a portion to be the magnetic recording medium sliding surface, the step of forming a wear resistant film of a prescribed thickness to cover the shaped magnetic recording medium sliding surface.

According to this method, the wear amount on the magnetic recording medium sliding surface is reduced in magnetic tape sliding, so that life of the thin film magnetic head can be extended.

The thin film magnetic head in accordance with the present invention includes: a substrate having a front end and a rear end; an element portion for reading a magnetic signal provided in the vicinity of the front end on the substrate, and having a magnetic gap between the surface of the substrate in the vicinity of the front end and the element portion; a wiring connection portion provided in the vicinity of the rear end on the substrate, and connected to a terminal wiring for taking out an electric signal from the element portion; and a resin mold formed to cover a region from the front end to the rear end of the substrate including the element portion and the wiring connection portion, wherein a magnetic recording medium sliding surface is formed at the front end of the substrate and the resin mold.

As described above, according to the manufacturing method of the present invention, the thin film magnetic head can be efficiently manufactured through comparably simple process without a complicated step such as formation of a mineral material film. The thin film magnetic head with excellent abrasion or moisture resistance can thus be formed with the high yield and the comparably lower manufacturing cost.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The method of manufacturing the thin film magnetic head in accordance with the first embodiment of the present invention will now be described with reference to FIGS. 1A to 1E and FIG. 2. While the invention will be described in connection with formation of a magnetoresistance effect type magnetic head in all the following embodiments, it may be similarly applied to a magnetic induction type magnetic head, except that a bias lead and an MR element are replaced by a conductor coil.

Figure 1A:
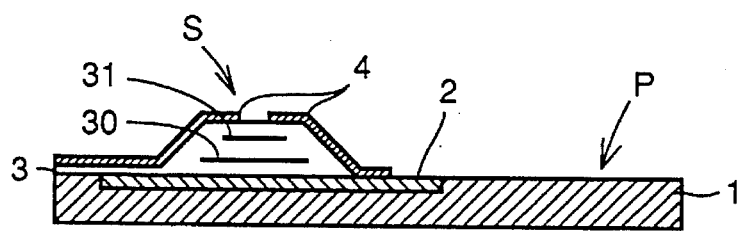
FIGS. 1A to 1E are cross sectional views sequentially showing respective steps in a method of manufacturing a thin film magnetic head in accordance with a first embodiment of the present invention.

In the manufacturing method in accordance with the first embodiment, as shown in FIG. 1A, an element portion S is initially formed on a wafer substrate 1. Considering wear resistance, crystallized glass or Mn—Zn—ferrite is employed as a guide for substrate 1. Phenol family resin containing glass fiber, glass beads, graphite, or the like may be employed as a material for substrate 1.

A lower magnetic core layer 2, which is a soft magnetic thin film of Ni—Fe, Fe—Al—Si, Fe—Al—N, Co—Zr or the like having highly-saturated magnetic characteristics, is formed on substrate 1. A magnetic gap 3 made of a mineral insulating layer of $SiO_2$, $Si_3N_4$, $Al_2O_3$ or the like is formed on the upper surface of lower magnetic core layer 2 with a sputter method or the like.

A bias lead 30 and an MR element 31 are formed and covered with an insulating layer, and thereafter, an upper magnetic core layer 4 is formed thereon. The formation process of element portion S described above is the same as that in the conventional manufacturing process.

Figure 1B:
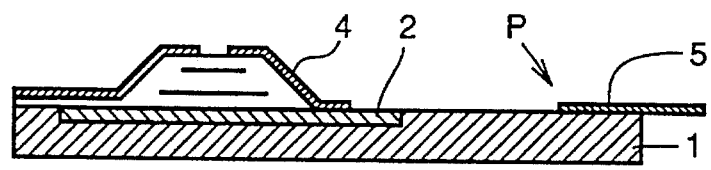

As shown in FIG. 1B, wafer substrate 1 is cut by a row or a chip in parallel to a surface to be a magnetic tape sliding surface. A flexible printed substrate 5 is connected to a wiring connection portion P on substrate 1 through a terminal wiring by a wire bonding method or a TAB method.

Figure 1C:
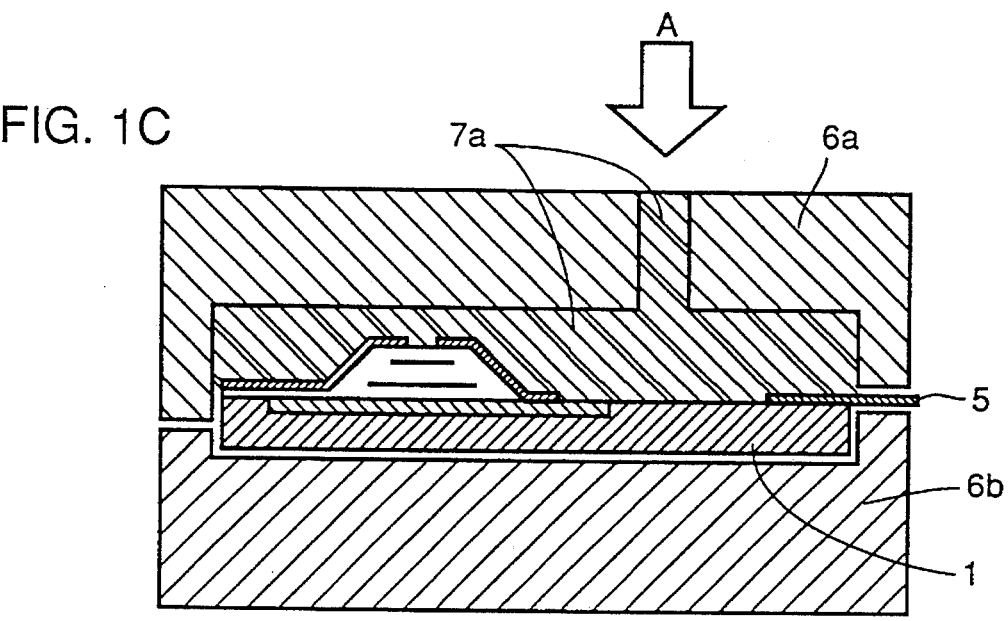
Figure 1D:
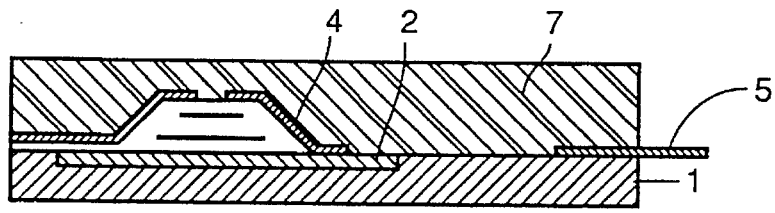

As shown in FIG. 1C, substrate 1 is inserted between resin-shaping molds 6a and 6b, and phenol resin 7a is injected into the molds as indicated by the arrow A. Glass fiber, glass beads, graphite or the like is introduced into phenol resin 7 for improving wear resistance and slidability. Through this injection molding, phenol resin 7a is injected under pressure into molds 6a and 6b between which substrate 1 inserted, and set by heating, so that a resin mold 7 is integrally formed on substrate 1 including element portion S and wiring connection portion P, as shown in FIG. 1D.

Figure 1E:
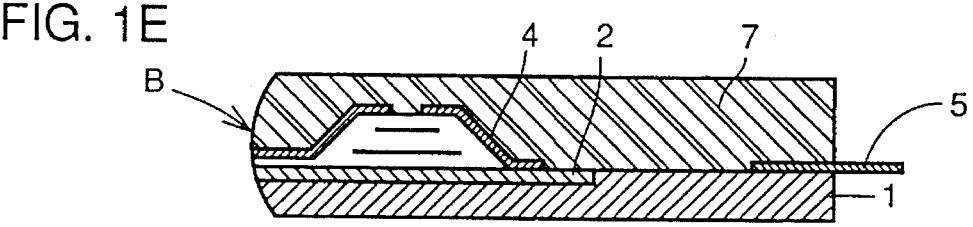
Figure 2:
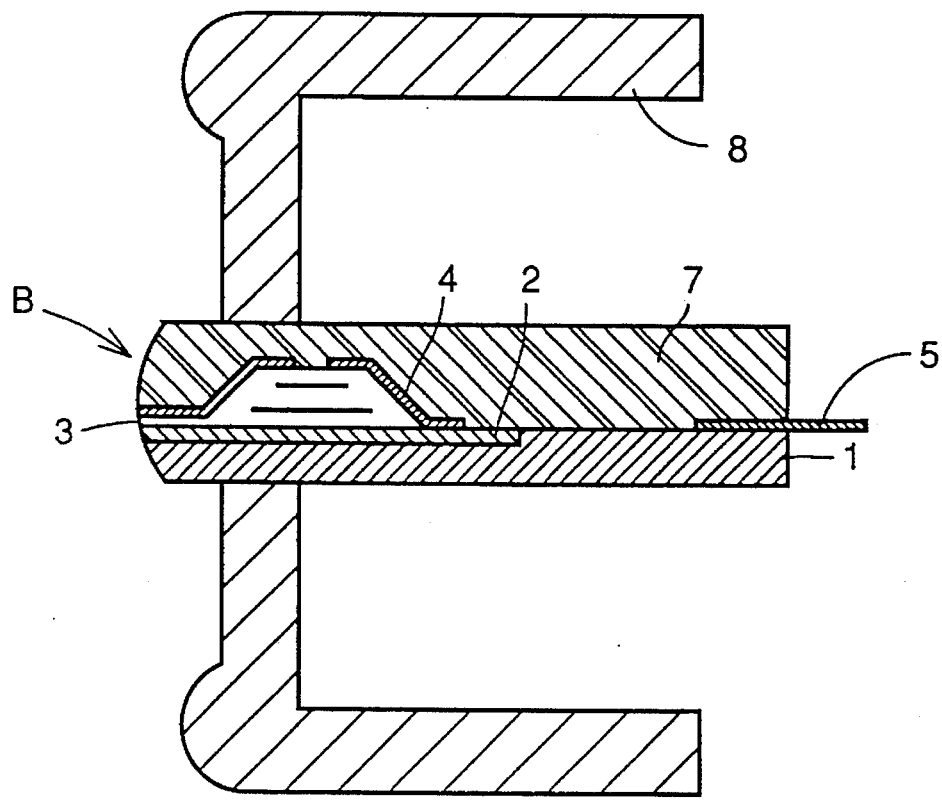
FIG. 2 is a cross sectional view showing a step subsequent to the step shown in FIG. 1E in the method of manufacturing the thin film magnetic head in accordance with the first embodiment of the present invention.
Figure 11:
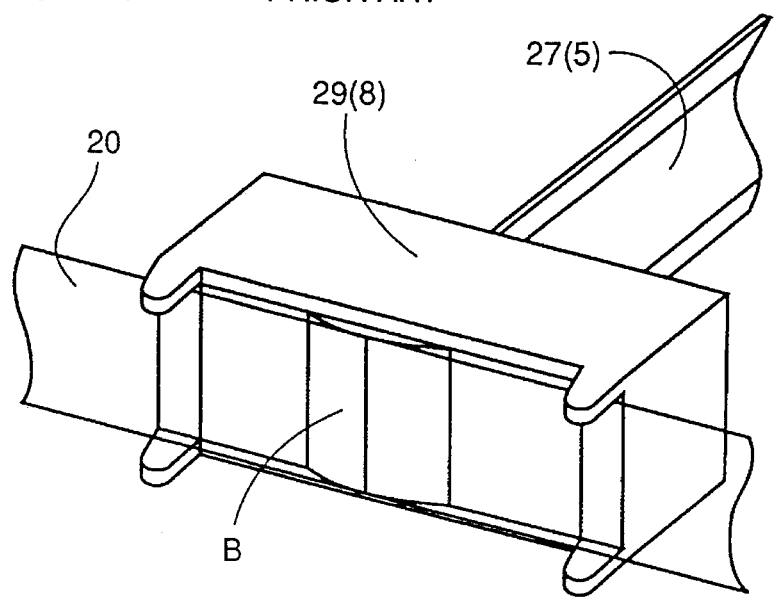
FIG. 11 is a perspective view showing the appearance of a magnetic head unit formed through a general manufacturing method of a thin film magnetic head including the conventional method and that in accordance with the present invention.

As shown in FIG. 1E, a magnetic tape sliding surface B with a prescribed gap depth is formed by cylindrical grinding and tape lapping. A thin film magnetic head in a cut off tip is incorporated with prescribed accuracy into a tape guide 8, as shown in FIG. 2, whereby a thin film magnetic head unit as shown in FIG. 11 is completed.

The above steps in FIGS. 1B to 1E and FIG. 2 may be performed by either of a row and a chip on the wafer substrate. Tape guide 8 can be integrally formed in resin molding shown in FIG. 1E.

Figure 3:
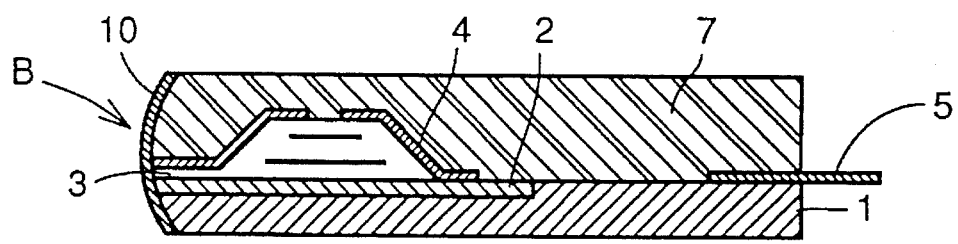
FIG. 3 is a cross sectional view showing the structure of the thin film magnetic head where, after forming a magnetic tape sliding surface, a wear resistant film 10 is formed thereon in the method of manufacturing the thin film magnetic head in accordance with the first embodiment of the present invention.

It is desirable, after forming magnetic head sliding surface B shown in FIG. 1E in the present embodiment, to form a wear resistant film 10 on the surface of magnetic tape sliding surface B, as shown in FIG. 3, for enhancing wear resistance of magnetic tape sliding surface B. One method of forming wear resistant film 10 is, for example, after magnetic tape sliding surface B is finished by cylindrical grinding and tape lapping, to form a Cr metal film by sputtering or vapor deposition, and thereafter, form a film of CrN, $Cr_2O_3$ or the like having high wear resistance. The thickness of wear resistant film 10 formed of such a stack of these films is preferably 600–1000 Å, approximately.

The Cr metal film should be formed prior to formation of CrN having wear resistance because Cr has good adhesion for resin. In formation of the Cr film, much glass fiber formed of $SiO_2$ containing graphite may be introduced into phenol resin 7 for enhancing adhesion of the Cr film to the phenol resin surface. One method of forming a CrN film or a $Cr_2O_3$ film after forming the Cr film is to perform reactive sputtering with a sputtering gas $N_2$ or $O_2$ when formation of the Cr film by sputtering has completed, so as to sequentially form the Cr film and the CrN film and the like, where the resultant films have excellent physical strength.

The method of manufacturing the thin film magnetic head in the second embodiment in accordance with the present invention will now be described with reference to FIGS. 4A to 4E and FIG. 5.

Figure 4A:
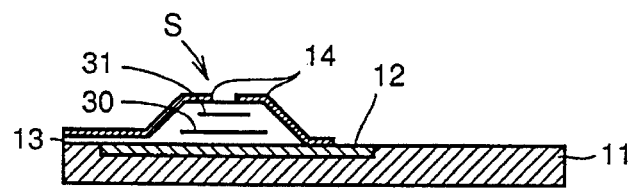
FIGS. 4A to 4E are cross sectional views sequentially showing respective steps in a method of manufacturing a thin film magnetic head in accordance with a second embodiment of the present invention.
Figure 4B:
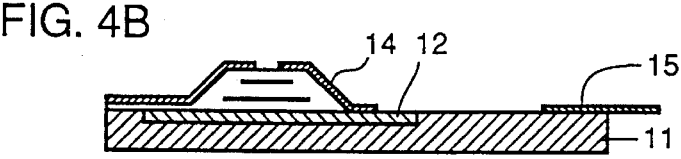
Figure 4C:
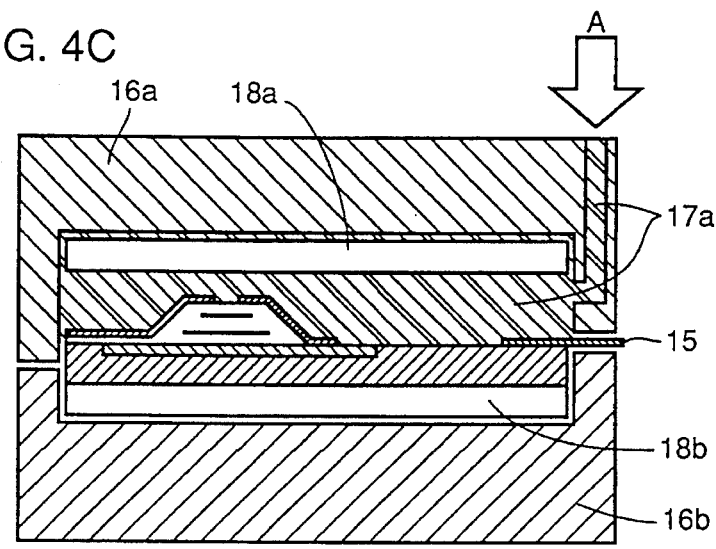
Figure 4D:
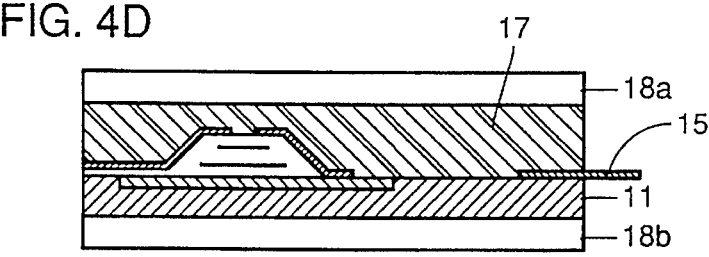
Figure 4E:
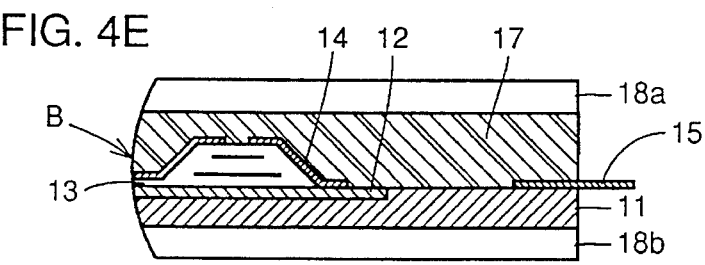
Figure 5:
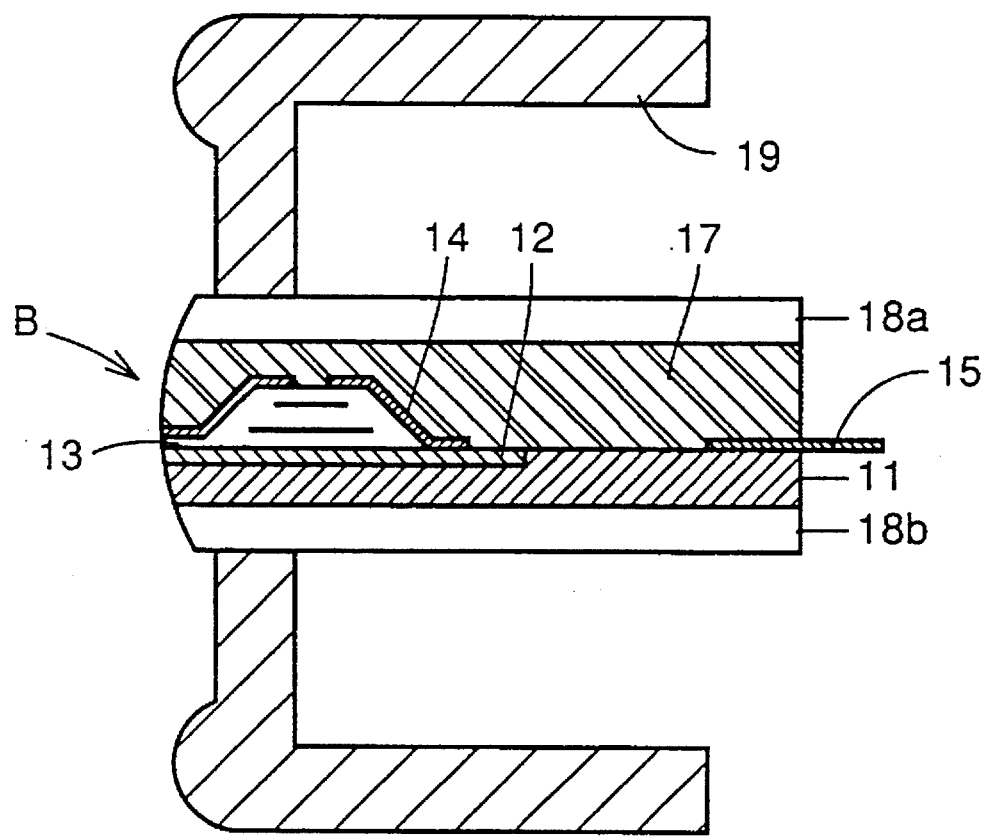
FIG. 5 is a cross sectional view showing a step subsequent to the step shown in FIG. 4E in the method of manufacturing the thin film magnetic head in accordance with the second embodiment of the present invention.

In this embodiment, element portion S is formed on a substrate 11 in the steps shown in FIGS. 4A and 4B, similarly to those shown in FIGS. 1A and 1B, and a terminal wiring 15 such as a flexible substrate is connected to wiring connection portion P. As shown in FIG. 4C, metal plates 18a and 18b are incorporated into molds 16a, 16b, substrate 11 is inserted into molds 16a and 16b, and phenol resin 17 is injected as indicated by the arrow A. Through this injection molding, phenol resin 17 is injected under pressure into molds 16a and 16b. Similarly to the first embodiment, element portion S and wiring connection portion P are thus simultaneously resinmolded on substrate 11. Resin mold 17 is integrally formed on substrate 11 with metal plates 18a and 18b respectively attached on the upper side of resin mold 17 and the lower side of substrate 11 as shown in FIG. 4D. Subsequently, in the steps shown in FIGS. 4E and 5, magnetic tape sliding surface B is formed and incorporated into a tape guide 19 as in the steps shown in FIG. 1E and FIG. 2 of the first embodiment so that a thin film magnetic head unit is completed.

Wear resistance of the magnetic tape sliding surface can be enhanced by integrally forming resin mold 17 on substrate 11 with metal plates 18a and 18b respectively attached on the upper surface of resin mold 17 and the lower surface of substrate 11, as described above. In this case, the closer to element portion S upper and lower metal plates 18a and 18b are provided, the more enhanced is the wear resistance. When a magnetic substance is employed for metal plates 18a and 18b, metal plates 18a and 18b serve as a magnetic shield, so that magnetic characteristics can also be improved.

Figure 6:
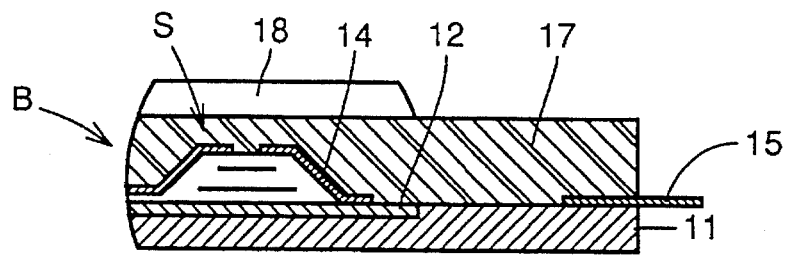
FIG. 6 is a cross sectional view showing the structure of the thin film magnetic head where a metal plate 18 is provided only on the region of an element portion S in the method of manufacturing the thin film magnetic head in accordance with the second embodiment of the present invention.

Metal plates 18a and 18b can be secured to be integrally formed by applying epoxy family adhesive or rubber type adhesive on the attaching surfaces of metal plates 18a and 18b incorporated into molds 16a and 16b, prior to injecting phenol resin 17a under pressure. Since metal plates 18a and 18b are attached for enhancing wear resistance of element portion S at magnetic tape sliding surface B, metal plates 18a and 18b need not necessarily be provided on the whole upper and lower surfaces of substrate 11. As shown in FIG. 6, for example, metal plate 18 may be formed only in the region from magnetic tape sliding surface B over element portion S on the upper surface of substrate 11.

Figure 7:
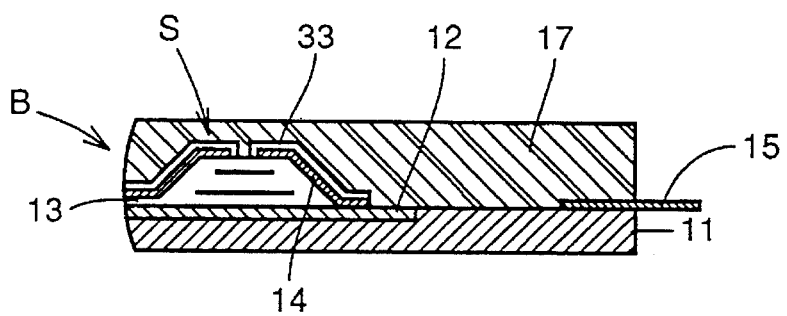
FIG. 7 is a cross sectional view showing the structure of the thin film magnetic head where a silicon oxide film 33 is formed between an upper magnetic core layer 14 and a resin mold 17 in the method of manufacturing the thin film magnetic head in accordance with the first embodiment of the present invention.

While in these embodiments, resin mold 17 is integrally formed in direct contact with the upper surface of upper magnetic core layer 14, a silicon oxide film 33 can be interposed between the upper surface of upper magnetic core layer 14 and resin mold 17, as shown in FIG. 7, so that water entering element portion S can be prevented, enhancing moisture resistance of the thin film magnetic head.

It is only necessary, for forming silicon oxide film 33, to form a silicon film having the thickness of 2000 Å to 1 μm by sputtering silicon dioxide, prior to injection of phenol resin 17a under pressure for forming resin mold 17. It is also possible to form a silicon oxide film all over the surface of substrate 11 subsequent to forming element portion S, to connect terminal wiring 15 to a portion for a connecting pad to terminal wiring 15 after removing the silicon oxide film by reactive ion etching, and thereafter, to inject phenol resin 17a under pressure.

Since upper magnetic core layer 14 is sandwiched between gap layer 13 and silicon oxide film 33 in the vicinity of magnetic tape sliding surface B in such a structure with silicon oxide 33 interposed, wear resistance of upper magnetic core layer 14 can also be enhanced. Such silicon oxide film 33, which serves also as a passivation film, does not particularly raise the manufacturing cost, since it requires the thickness only of 2000 Å–1 μm while the passivation film in the conventional manufacturing process of the thin film magnetic head has the thickness of 10–20 μm, and requires flattening process.

Figure 8:
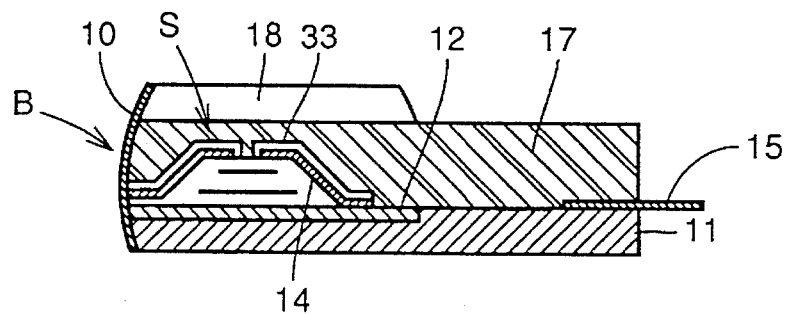
FIG. 8 is a cross sectional view showing one example of the structure of the thin film magnetic head having all the characteristics of those shown in FIGS. 3, 6 and 7.
Figure 9A:
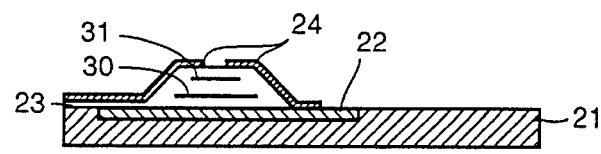
FIGS. 9A to 9F are cross sectional views sequentially showing the first to sixth steps of a conventional method of manufacturing a thin film magnetic head.
Figure 9B:
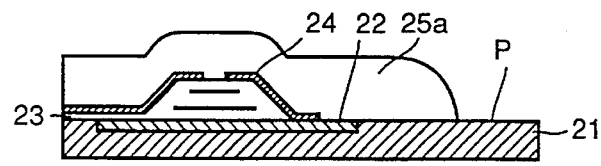
Figure 9C:
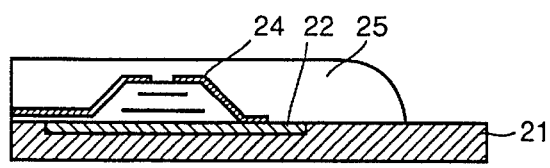
Figure 9D:
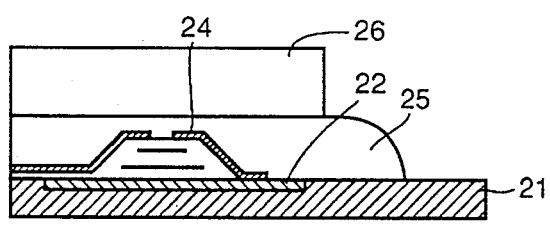
Figure 9E:
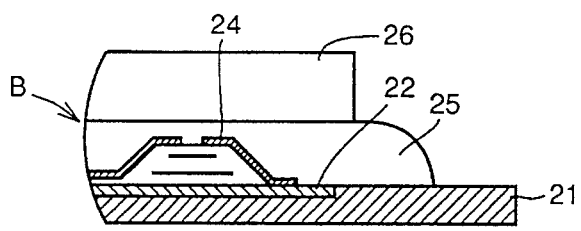
Figure 9F:
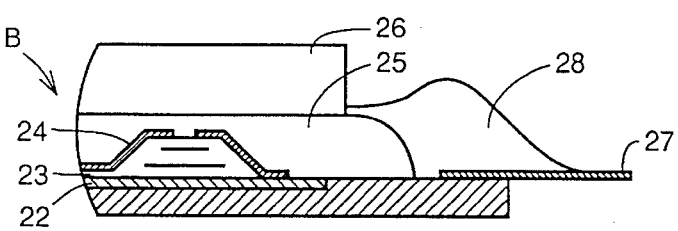
Figure 10:
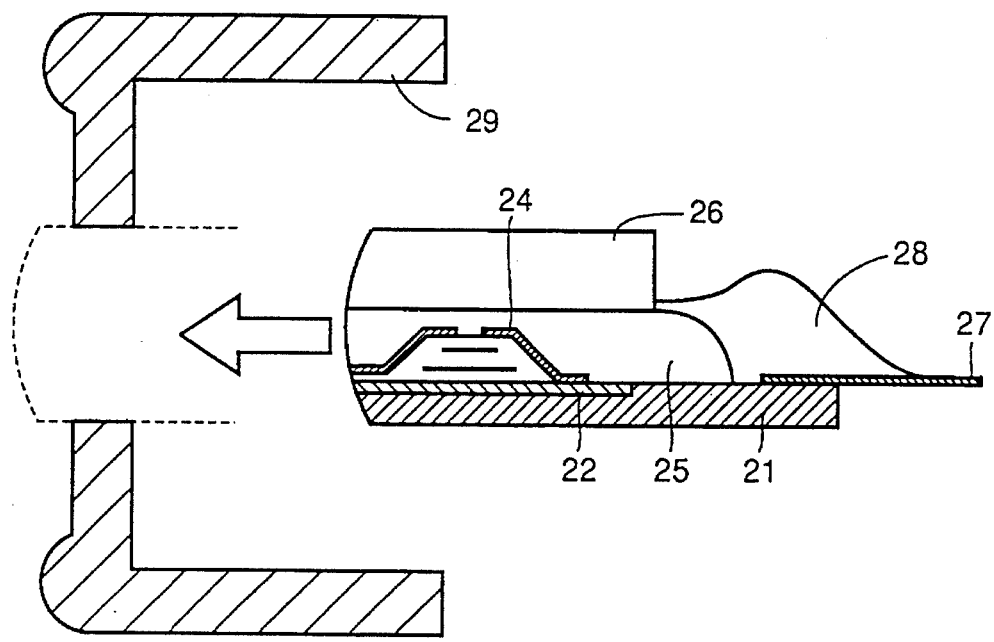
FIG. 10 is a cross sectional view showing a step subsequent to the step shown in FIG. 9F in the conventional method of manufacturing the thin film magnetic head.

FIG. 8 shows a cross section of the structure of a thin film magnetic head in accordance with a further embodiment including all the characteristics of the embodiments shown in FIGS. 3, 6 and 7. In this thin film magnetic head, the surface of magnetic tape sliding surface B is covered with wear resistant film 10, metal plate 18 is provided in the region of element portion S on the upper surface of resin mold 17, and silicon oxide film 33 is interposed between the upper surface of upper magnetic core layer 14 and resin mold 17. Through such a structure, wear resistance of resin mold 17 and moisture resistance of the thin film magnetic head can be enhanced. The thin film magnetic head with such a structure can be readily implemented by combining the above-described process for forming the structures in FIGS. 3, 6 and 7.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a thin film magnetic head, said head including, on a resin substrate thereof, an element portion for reading a magnetic signal, and a wiring connection portion connected to a terminal wiring for taking out an electric signal from the element portion, said method comprising the steps of:

forming said element portion on the resin substrate;

connecting said terminal wiring to said wiring connection portion;

inserting said resin substrate and said terminal wiring into a mold;

injecting resin material into said mold to form a resin cover of said magnetic head and to form a tape guide of said magnetic head, said resin cover and said tape guide being formed of the same resin material and integrally with each other; and shaping an end of said resin substrate in the vicinity of said element portion to form a magnetic recording medium sliding surface.

2. The method of manufacturing the thin film magnetic head according to claim 1, wherein said inserting step includes attaching a metal plate in a cavity of said mold.

3. The method of manufacturing the thin film magnetic head according to claim 1, wherein said inserting step includes attaching a metal plate on both an upper and a lower surface of a hollow cavity of said mold.

4. The method of manufacturing the thin film magnetic head according to claim 1, further comprising the step of forming a silicon oxide film of a prescribed thickness on an upper surface of an upper magnetic core layer included in said element portion, prior to said inserting step.

5. The method of manufacturing the thin film magnetic head according to claim 1, further comprising the step of, after said step of shaping the end of said substrate, forming a wear resistant film made of chromium nitride or chromium oxide of a prescribed thickness on said formed magnetic recording medium sliding surface.

6. The method of manufacturing the thin film magnetic head according to claim 1, wherein said step of shaping the end of said substrate includes the step of finishing said magnetic tape sliding surface by cylindrical grinding and tape lapping.

7. The method of manufacturing the thin film magnetic head according to claim 1, wherein said resin material is phenol resin.

8. The method of manufacturing the thin film magnetic head according to claim 7, wherein prior to injecting phenol resin into said mold, introducing into the phenol resin material a material selected from the group consisting of glass fiber, glass beads and graphite.

9. The method of manufacturing the thin film magnetic head according to claim 5, wherein said step of forming said wear resistant film includes the step of forming a chromium film on said magnetic recording medium sliding surface, and further forming a film of chromium nitride or chromium oxide on the chromium film.

10. The method of manufacturing the thin film magnetic head according to claim 9, wherein said wear resistant film is formed to have a thickness of 600 to 1000 Å.

* * * * *